(12) United States Patent
Kim et al.

(10) Patent No.: US 11,056,284 B2
(45) Date of Patent: Jul. 6, 2021

(54) MULTI-LAYERED CERAMIC ELECTRONIC COMPONENT

(71) Applicant: SAMSUNG ELECTRO-MECHANICS CO., LTD., Suwon-si (KR)

(72) Inventors: Je Jung Kim, Suwon-si (KR); Jeong Mo Kang, Suwon-si (KR); Dong Yeong Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/502,547

(22) Filed: Jul. 3, 2019

(65) Prior Publication Data

US 2020/0335282 A1 Oct. 22, 2020

(30) Foreign Application Priority Data

Apr. 17, 2019 (KR) ........................ 10-2019-0044836

(51) Int. Cl.
*H01G 4/30* (2006.01)
*H01G 4/228* (2006.01)
*H01G 4/12* (2006.01)
*H01G 4/012* (2006.01)

(52) U.S. Cl.
CPC ............... *H01G 4/30* (2013.01); *H01G 4/012* (2013.01); *H01G 4/12* (2013.01); *H01G 4/228* (2013.01)

(58) Field of Classification Search
CPC ............ H01G 4/30; H01G 4/12; H01G 4/012; H01G 4/228
See application file for complete search history.

(56) References Cited

U.S. PATENT DOCUMENTS

| 8,941,971 | B2 * | 1/2015 | Park | H01G 4/2325 |
| | | | | 361/301.4 |
| 9,406,443 | B2 * | 8/2016 | Katsuta | H01G 4/0085 |
| 10,026,556 | B2 * | 7/2018 | Ando | H01G 4/005 |
| 10,361,035 | B1 * | 7/2019 | Song | H01G 4/1227 |

(Continued)

FOREIGN PATENT DOCUMENTS

| JP | 3905994 B2 | 1/2007 |
| JP | 2011-18874 A | 1/2011 |
| KR | 10-2014-0041022 A | 4/2014 |

*Primary Examiner* — Nathan Milakovich
(74) *Attorney, Agent, or Firm* — Morgan, Lewis & Bockius LLP

(57) ABSTRACT

A multi-layered ceramic electronic component includes: a ceramic body including a dielectric layer, and a plurality of internal electrodes facing each other with the dielectric layer interposed therebetween; and an external electrode disposed on an external surface of the ceramic body and electrically connected to the first internal electrodes or the second internal electrodes. The external electrode includes a first electrode layer electrically connected to the internal electrodes and a second electrode layer disposed on the first electrode layer, and a ratio (t1/BW) of a thickness (t1) of a region of the first electrode layer disposed on the third surface or the fourth surface of the ceramic body to a distance (BW) from one end of the first electrode layer to the other end of the first electrode layer disposed on the first surface or the second surface of the ceramic body satisfies 20% or less.

8 Claims, 4 Drawing Sheets

(56) References Cited

U.S. PATENT DOCUMENTS

| | | |
|---|---|---|
| 10,381,160 B2* | 8/2019 | Sakatsume ............. H01G 4/232 |
| 10,643,781 B2* | 5/2020 | Shimoyasu ......... H01F 17/0013 |
| 2011/0007449 A1 | 1/2011 | Seo et al. |
| 2013/0242457 A1* | 9/2013 | Lee ...................... H01G 4/2325 |
| | | 361/301.4 |
| 2014/0085770 A1 | 3/2014 | Park et al. |
| 2019/0164693 A1* | 5/2019 | Ono ....................... H01G 4/012 |
| 2020/0075252 A1* | 3/2020 | Kim ....................... H01G 4/012 |
| 2020/0075257 A1* | 3/2020 | Kim ........................ H01G 4/30 |
| 2020/0185153 A1* | 6/2020 | Yun ....................... H01G 4/012 |

* cited by examiner

MULTI-LAYERED CERAMIC ELECTRONIC COMPONENT

CROSS-REFERENCE TO RELATED APPLICATION

This application claims benefit of priority to Korean Patent Application No. 10-2019-0044836 filed on Apr. 17, 2019 in the Korean Intellectual Property Office, the disclosure of which may be incorporated herein by reference in its entirety.

TECHNICAL FIELD

The present disclosure relates to a multi-layered ceramic electronic component, and more particularly to a multi-layered ceramic electronic component having excellent reliability.

BACKGROUND

In recent years, miniaturization, slimming, and multifunctionalization of electronic products have required the miniaturization of multi-layered ceramic capacitors, and mounting of multi-layered ceramic capacitors may be also highly integrated.

A multi-layered ceramic capacitor, an electronic component, may be mounted on the printed circuit boards of various electronic products and plays a role in charging or discharging electricity therein or therefrom, for example, a display device such as a liquid crystal display (LCD) and a plasma display panel (PDP), a computer, a personal digital assistant (PDA), a mobile phone, or the like, which may be mounted on a printed circuit board of various electronic products, to charge or discharge electricity.

Such a multi-layered ceramic capacitor may be used as a component of various electronic devices, due to having a relatively compact size, a relatively high capacity, relative ease of mounting, and the like.

In the meantime, as interest, in industry, in electric/electronic components has recently increased, multi-layered ceramic capacitors have also been required to have high reliability and high capacity in order to be used in vehicles or infotainment systems.

Particularly, multi-layered ceramic capacitors are required to have moisture resistance characteristics in a severe environment, and therefore, there is a need to improve internal and external structures for improving reliability for moisture resistance.

SUMMARY

An aspect of the present disclosure is to provide a multi-layered ceramic electronic component, and more particularly, to a multi-layered ceramic electronic component having excellent reliability.

According to an aspect of the present disclosure, a multi-layered ceramic electronic component includes: a ceramic body including a dielectric layer, and first and second internal electrodes facing each other with the dielectric layer interposed therebetween, the ceramic body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and an external electrode disposed on an external surface of the ceramic body and electrically connected to the first internal electrodes or the second internal electrodes. The ceramic body includes an active portion including the plurality of internal electrodes disposed to face each other with the dielectric layer interposed therebetween, to form capacity therein, and cover portions formed above and below the active portion. The external electrode includes a first electrode layer electrically connected to the first internal electrodes or the second internal electrodes and a second electrode layer disposed on the first electrode layer. The first electrode layer extends onto and is disposed on the first surface and the second surface of the ceramic body. A ratio ($t2/t1$) of a thickness ($t2$) of a region of the first electrode layer disposed on the first surface or the second surface of the ceramic body to a thickness ($t1$) of a region of the first electrode layer disposed on the third surface or the fourth surface of the ceramic body satisfies 40% to 120%, and a ratio ($t1/BW$) of the thickness ($t1$) to a distance ($BW$), in the second direction, from one end of the first electrode layer to the other end of the first electrode layer disposed on the first surface or the second surface of the ceramic body satisfies 20% or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
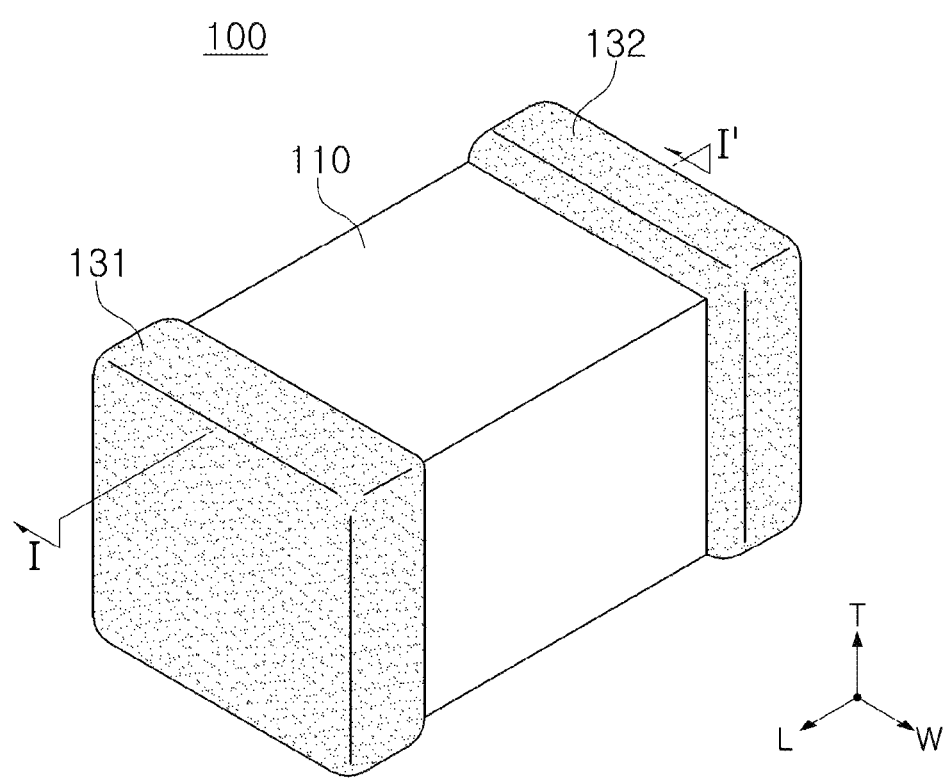
FIG. 1 is a perspective view illustrating a multi-layered ceramic capacitor according to an embodiment of the present disclosure.

Hereinafter, embodiments of the present disclosure will be described as follows with reference to the attached drawings.

Hereinafter, embodiments of the present disclosure may be modified to have various other forms, and the scope of the present disclosure is not limited to the embodiments described below. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

Throughout the specification, when an element is referred to as "comprising", it means that it may include other elements as well, rather than excluding other elements, unless specifically stated otherwise.

In order to clearly illustrate the present disclosure, portions not related to the description are omitted, and thicknesses are enlarged in order to clearly represent layers and regions, and similar portions having the same functions within the same scope are denoted by similar reference numerals throughout the specification.

Hereinafter, preferred embodiments of the present disclosure will be described with reference to the accompanying drawings.

FIG. 1 is a perspective view illustrating a multi-layered ceramic capacitor according to an embodiment of the present disclosure.

Figure 2:
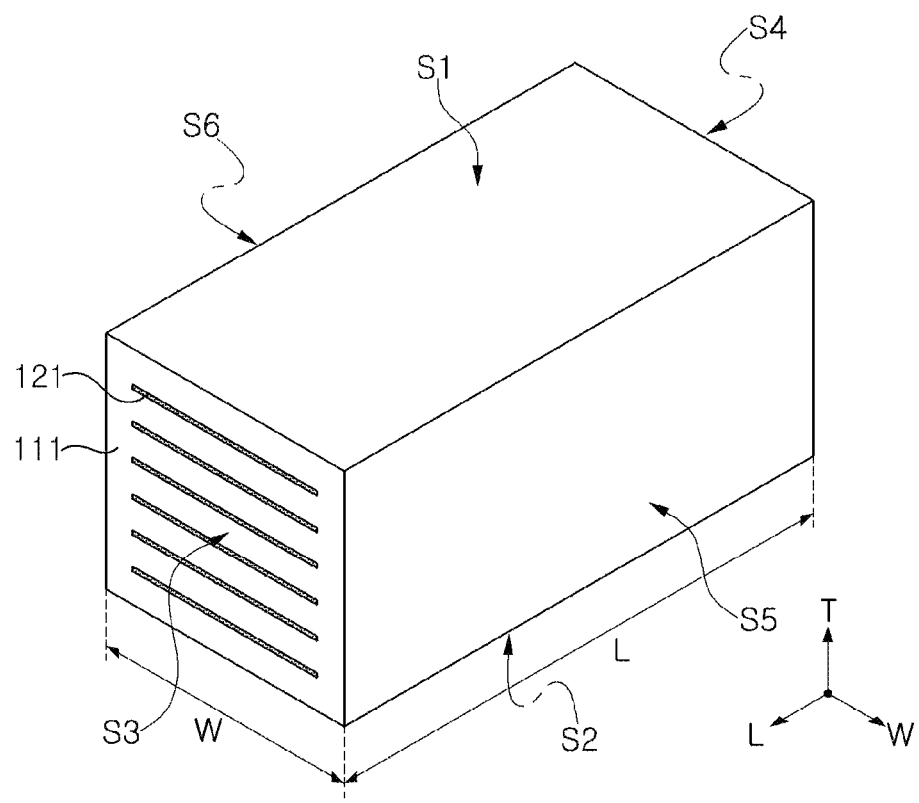
FIG. 2 is a schematic view illustrating a ceramic body according to an embodiment of the present disclosure.

FIG. 2 is a schematic view illustrating a ceramic body according to an embodiment of the present disclosure.

Figure 3:
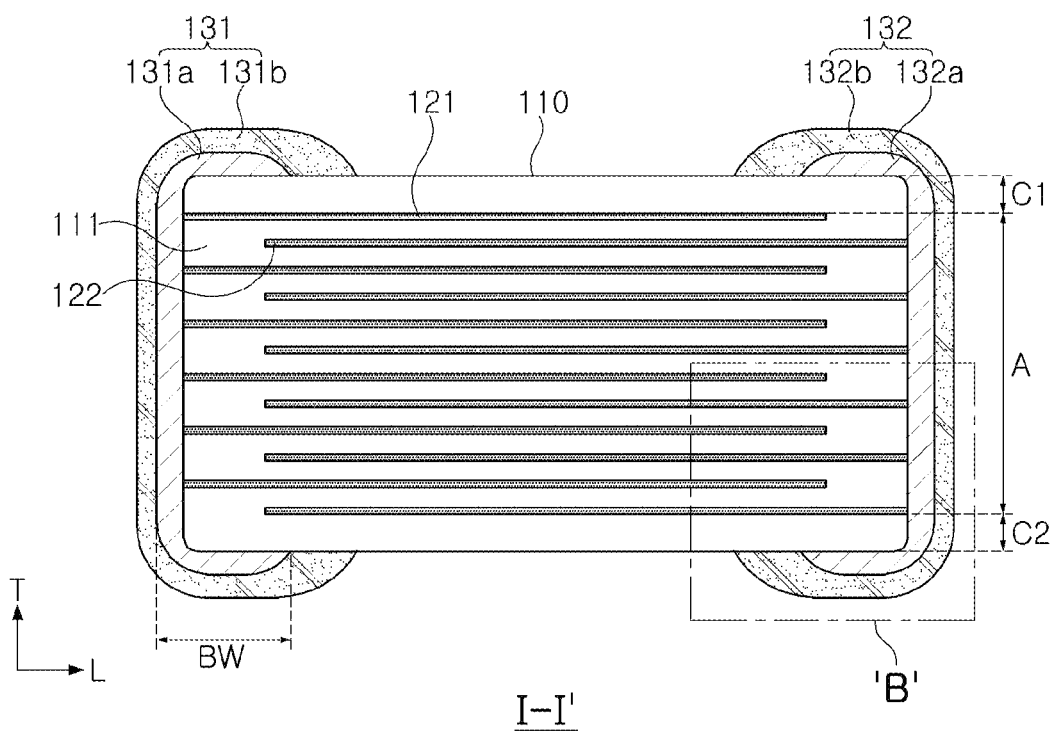
FIG. 3 is a cross-sectional view taken along line I-I' of FIG. 1.

FIG. 3 is a cross-sectional view taken along line I-I' of FIG. 1.

Figure 4:
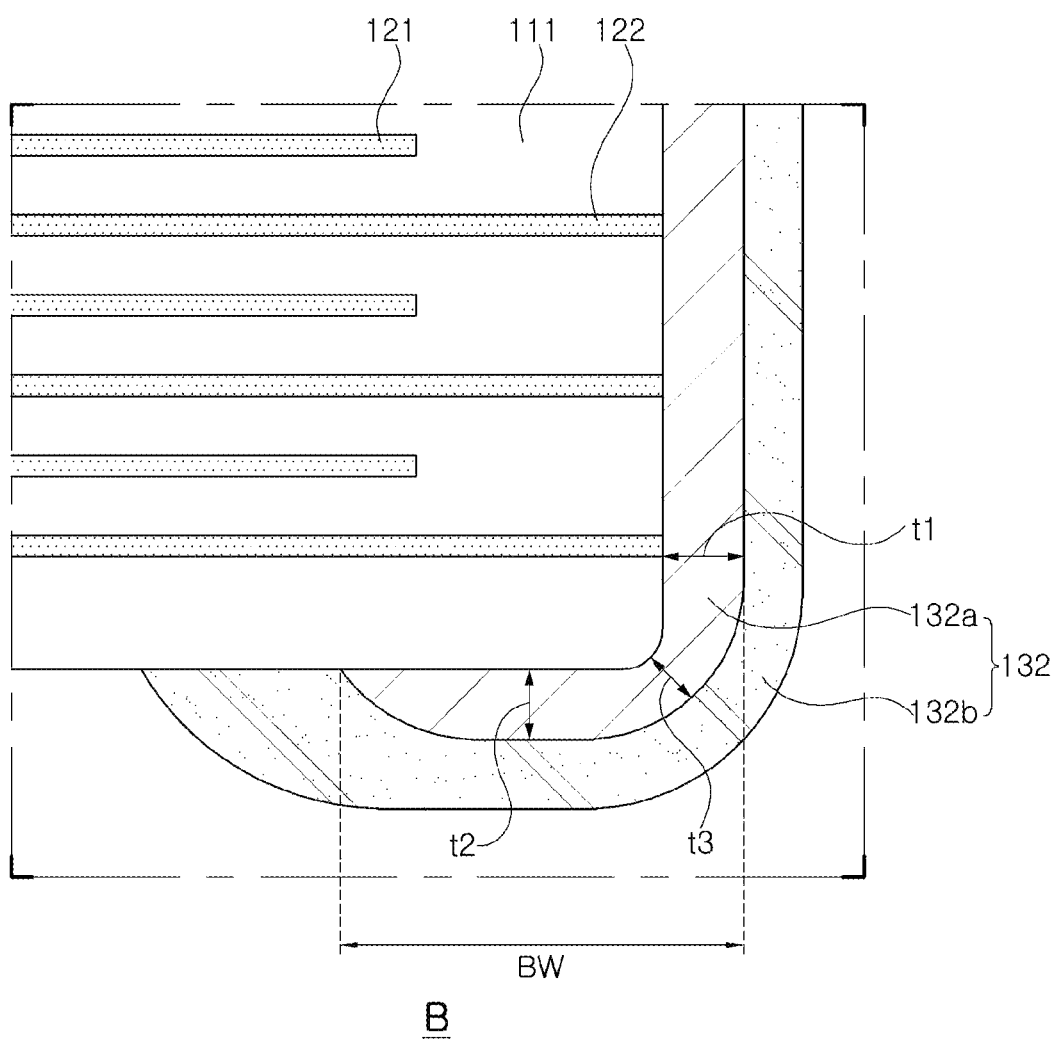
FIG. 4 is an enlarged view of region B in FIG. 3.

FIG. 4 is an enlarged view of region B in FIG. 3.

Referring to FIGS. 1 to 4, a multi-layered ceramic electronic device 100 according to an embodiment of the present disclosure may include a ceramic body 110 including a dielectric layer 111, and a plurality of internal electrodes 121 and 122 disposed to face each other with the dielectric layer 111 interposed therebetween, the ceramic body including a first surface S1 and a second surface S2 opposing each other in a first direction, a third surface S3 and a fourth surface S4 connected to the first surface S1 and the second surface S2 and opposing each other in a second direction, and a fifth surface S5 and a sixth surface S6 connected to the first surface to the fourth surface S1 to S4 and opposing each other in a third direction; and a plurality of external electrodes 131 and 132 disposed on an external surface of the ceramic body 110 and electrically connected to the plurality of internal electrodes 121 and 122. The ceramic body 110 includes an active portion A including the plurality of internal electrodes 121 and 122 disposed to face each other with the dielectric layer interposed therebetween, to form capacity therein, and cover portions C1 and C2 disposed above and below the active portion.

Hereinafter, a multi-layered ceramic electronic device according to an embodiment of the present disclosure will be described and a laminated ceramic capacitor will be described, but the present disclosure may not be limited thereto.

In the multi-layered ceramic capacitor according to one embodiment of the present disclosure, a 'longitudinal direction' may be defined as an 'L' direction, a 'width direction' may be defined as a 'W' direction, and a 'thickness direction' may be defined as a 'T' direction. Here, the 'thickness direction' may be used in the same sense as the direction in which the dielectric layers are stacked up, e.g., as a 'layering direction' or 'stacking direction.'

In one embodiment of the present disclosure, a shape of the ceramic body 110 is not particularly limited, but may be a hexahedral shape, as illustrated.

The ceramic body 110 may include a first surface S1 and a second surface S2 opposing each other in a first direction, a third surface S3 and a fourth surface S4 connected to the first surface S1 and the second surface S2 and opposing each other in a second direction, and a fifth surface S5 and a sixth surface S6 connected to the first surface to the fourth surface S1 to S4 and opposing each other in a third direction.

The first surface S1 and the second surface S2 may be defined as surfaces facing each other in the thickness direction of the ceramic body 110, which is the first direction, the third surface S3 and the fourth surface S4 may be defined as surfaces facing each other in the length direction of the ceramic body 110, which is the second direction, and the fifth surface S5 and the sixth surface S6 may be defined as surfaces facing each other in the width direction of the ceramic body 110, the third direction.

Each end of the plurality of internal electrodes 121 and 122 formed in the ceramic body 110 may be exposed to the third surface S3 or the fourth surface S4 of the ceramic body.

The internal electrodes 121 and 122 may have a pair of first internal electrodes 121 and second internal electrodes 122 having different polarities.

One end of the first internal electrode 121 may be exposed to the third surface S3, and one end of the second internal electrode 122 may be exposed to the fourth surface S4.

The other ends of the first internal electrode 121 and the second internal electrode 122 may be formed at regular intervals from the fourth surface S4 or the third surface S3.

The first and second external electrodes 131 and 132 may be formed on the third surface S3 and the fourth surface S4 of the ceramic body to be electrically connected to the internal electrodes.

According to one embodiment of the present disclosure, a raw material for forming the dielectric layer 111 is not particularly limited as long as a sufficient electrostatic capacity may be obtained. For example, a barium titanate-based material, a lead composite perovskite-based material, strontium titanate-based material, or the like may be used.

A variety of ceramic additives, organic solvents, plasticizers, binders, dispersants, and the like may, as a material for forming the dielectric layer 111, be added to powder particle of barium titanate ($BaTiO_3$), and the like, depending on the purpose of the present disclosure.

The ceramic body 110 may include an active portion A serving as a portion contributing to capacity formation of the capacitor, and an upper cover portion C1 and a lower cover portion C2 formed respectively above and below the active portion A as upper and lower margin portions.

The active portion A may be formed by repeatedly stacking the plurality of first and second inner electrodes 121 and 122 with the dielectric layer 111 interposed therebetween.

The upper cover portion C1 and the lower cover portion C2 may have the same material and configuration as the dielectric layer 111, except that they do not include internal electrodes.

For example, the upper cover portion C1 and the lower cover portion C2 may include a ceramic material, for example, a barium titanate ($BaTiO_3$) based ceramic material.

The upper cover portion C1 and the lower cover portion C2 may be formed by stacking a single dielectric layer or two or more dielectric layers on upper and lower surfaces of the active portion A in the vertical direction, respectively, and may function to basically prevent the internal electrodes from being damaged by physical or chemical stress.

A material forming the first and second internal electrodes 121 and 122 is not particularly limited, and may be formed using a conductive paste including one or more materials of silver (Ag), lead (Pb), platinum (Pt), nickel (Ni), and copper (Cu).

A multi-layered ceramic capacitor according to an embodiment of the present disclosure may include a first external electrode 131 electrically connected to the first internal electrode 121, and a second external electrode 132 electrically connected to the second internal electrode 122.

The first and second external electrodes 131 and 132 may be electrically connected to the first and second internal electrodes 121 and 122 for formation of electrostatic capacitance, and the second external electrode 132 may be connected to a potential different from that of the first external electrode 131.

The first and second external electrodes 131 and 132 may be respectively disposed on the third surface S3 and the fourth surface S4 in the length direction, which is the second direction of the ceramic body 110, and may extend onto and be disposed on the first surface S1 and the second surface S2 in the thickness direction, which is the first direction of the ceramic body 110.

The external electrodes 131 and 132 may be disposed on an external surface of the ceramic body 111, and may include first electrode layers 131a and 132a electrically connected to the internal electrodes 121 and 122, and second electrode layers 131b and 132b disposed on the first electrode layers 131a and 132a.

The first electrode layers 131a and 132a may include a conductive metal and a glass.

The conductive metal used for the first electrode layers 131a and 132a is not particularly limited as long as it is a material that may be electrically connected to the internal electrodes for the formation of electrostatic capacitance, and may be, for example, one or more selected from the group consisting of copper (Cu), silver (Ag), nickel (Ni), and alloys thereof.

The first electrode layers 131a and 132a may be formed by applying a conductive paste prepared by adding glass frit to a conductive metal powder and then sintering the conductive paste.

The first electrode layers 131a and 132a may extend onto and be disposed the first surface S1 and the second surface S2 in the thickness direction, which is the first direction of the ceramic body 110.

The second electrode layers 131b and 132b may be formed on the first electrode layers 131a and 132a, and may completely cover the first electrode layers 131a and 132a.

A base resin included in the second electrode layers 131b and 132b is not particularly limited as long as it has adhesion and impact absorbing properties, and may be mixed with the conductive metal powder to form a paste. For example, the base resin may be an epoxy-based resin.

The conductive metal included in the second electrode layers 131b and 132b is not particularly limited as long as it is electrically connected to the first electrode layers 131a and 132a. For example, the conductive metal may include one or more selected from the group consisting of copper (Cu), silver (Ag), nickel (Ni), and alloys thereof.

According to an embodiment of the present disclosure, a ratio (t2/t1) of a thickness (t2) of a region in which the first electrode layers 131a and 132a are disposed on the first surface S1 and the second surface S2 in the thickness direction, which is the first direction of the ceramic body 110, to a thickness (t1) of a region in which the first electrode layers 131a and 132a are disposed on the third surface S3 and the fourth surface S4 in the length direction, which is the second direction of the ceramic body 110, may satisfy 40% to 120%.

The thickness (t1) of the region in which the first electrode layers 131a and 132a are disposed on the third surface S3 and the fourth surface S4 in the length direction, which is the second direction of the ceramic body 110, may be determined by measuring a thickness of a region corresponding to an outermost internal electrode among the plurality of internal electrodes 121 and 122 disposed in the active portion A.

The thickness (t2) of the region in which the first electrode layers 131a and 132a are disposed on the first surface S1 and the second surface S2 in the thickness direction, which is the first direction of the ceramic body 110, may be determined by measuring a thickness of a central portion on the basis of a distance from one end of the first electrode layers 131a and 132a to the other end disposed on the first surface S1 and the second surface S2 of the ceramic body 110.

The ratio (t2/t1) of the thickness (t2) of the region in which the first electrode layers 131a and 132a are disposed on the first surface S1 and the second surface S2 in the thickness direction, the first direction of the ceramic body 110, to the thickness (t1) of the region in which the first electrode layers 131a and 132a are disposed on the third surface S3 and the fourth surface S4 in the length direction, the second direction of the ceramic body 110, may be controlled to satisfy 40% to 120%, to improve coverage of a corner portion of the ceramic body. Therefore, reliability for moisture resistance may be enhanced.

For example, the thickness (t2) of the first electrode layers 131a and 132a disposed on the first surface S1 and the second surface S2 in the thickness direction, the first direction of the ceramic body 110, may become thicker than a conventional thickness, to also increase the thickness of the corner portion. Therefore, the reliability may be enhanced by the coverage improvement of the corner portion.

When the thickness ratio (t2/t1) of the two regions is less than 40%, a failure of reliability for moisture resistance may occur.

When the thickness ratio (t2/t1) of the two regions exceeds 120%, the external electrode of the multi-layered ceramic capacitor may be difficult to be formed, and an upper limit value thereof is limited to 120%.

According to another embodiment of the present disclosure, a ratio (t2/t1) of a thickness (t2) of a region in which the first electrode layers 131a and 132a are disposed on the first surface S1 and the second surface S2 in the thickness direction, the first direction of the ceramic body 110, to a thickness (t1) of a region in which the first electrode layers 131a and 132a are disposed on the third surface S3 and the fourth surface S4 in the length direction, the second direction of the ceramic body 110, may satisfy 80% to 120%.

The ratio (t2/t1) of the thickness (t2) of the region in which the first electrode layers 131a and 132a are disposed on the first surface S1 and the second surface S2 in the thickness direction, the first direction of the ceramic body 110, to the thickness (t1) of the region in which the first electrode layers 131a and 132a are disposed on the third surface S3 and the fourth surface S4 in the length direction, the second direction of the ceramic body 110, may satisfy 80% to 120%, to have more excellent reliability by the coverage of the corner portion.

According to an embodiment of the present disclosure, in addition to the characteristics, a ratio (t1/BW) of a thickness (t1) of a region in which the first electrode layers 131a and 132a are disposed on the third surface S3 and the fourth surface S4 of the ceramic body to a distance (BW) from one end of the first electrode layers 131a and 132a to the other end disposed on the first surface S1 and the second surface S2 of the ceramic body 110 may satisfy 20% or less.

The ratio (t1/BW) of the thickness (t1) of the region in which the first electrode layers 131a and 132a are disposed on the third surface S3 and the fourth surface S4 of the ceramic body to the distance (BW) from one end of the first electrode layers 131a and 132a to the other end disposed on the first surface S1 and the second surface S2 of the ceramic body 110, may be controlled to satisfy 20% or less, to improve the bending strength of the capacitor.

When the ratio (t1/BW) of the thickness (t1) of the region in which the first electrode layers 131a and 132a are disposed on the third surface S3 and the fourth surface S4 of the ceramic body to the distance (BW) from one end of the first electrode layers 131a and 132a to the other end disposed on the first surface S1 and the second surface S2 of the ceramic body 110 exceeds 20%, frequency of occurrence of cracks by bending stress may increase, and reliability may deteriorate.

A lower limit of the ratio (t1/BW) is not particularly limited, is designed such that the distance (BW) from one end of the first electrode layers 131a and 132a to the other end disposed on the first surface S1 and the second surface S2 of the ceramic body 110 is required for each product, and is not particularly limited as long as it satisfies the design requirement.

According to an embodiment of the present disclosure, the distance (BW) from one end of the first electrode layers 131a and 132a to the other end disposed on the first surface S1 and the second surface S2 of the ceramic body 110 may vary depending on the size of the product, may be 400 μm or more in the case of a small size, and may be 700 μm or less as an upper limit when the size increases.

A thickness (t3) of a region in which the first electrode layers 131a and 132a are disposed at a corner portion of the ceramic body 110 and the thickness (t2) of the region in which the first electrode layers 131a and 132a are disposed on the first surface S1 and the second surface S2 of the ceramic body 120 may satisfy t3<t2.

According to an embodiment of the present disclosure, the thickness (t2) of the region in which the first electrode layers 131a and 132a are disposed on the first surface S1 and the second surface S2 of the ceramic body 120 may be made thick, to increase the thickness (t3) of the region in which the first electrode layers 131a and 132a are disposed at a corner portion of the ceramic body 110. Therefore, the coverage of the corner portions may increase. It is characterized in that the relationship t3<t2 is satisfied.

Hereinafter, a method of manufacturing a multi-layered ceramic electronic device according to an embodiment of the present disclosure will be described, but the present disclosure is not limited thereto.

In the method of manufacturing a multi-layered ceramic electronic device according to an embodiment of the present disclosure, a slurry formed by including a powder such as barium titanate ($BaTiO_3$) may be coated on a carrier film, and may be dried to form a plurality of ceramic green sheets, whereby a dielectric layer may be formed.

The ceramic green sheet may be prepared by mixing a ceramic powder, a binder, and a solvent to prepare a slurry, and the slurry may be formed as a sheet having a thickness of several micrometers by a doctor blade method.

Next, an internal electrode conductive paste containing nickel powder having an average nickel particle size of 0.1 μm to 0.2 μm and 40 to 50 parts by weight may be provided.

The internal electrode conductive paste was applied on the green sheet by a screen printing method to form internal electrodes, and a green sheet having internal electrode patterns arranged thereon was laminated to form a ceramic body 110.

Next, first electrode layers including one or more conductive metals selected from the group consisting of copper (Cu), silver (Ag), nickel (Ni), and alloys thereof, and glass, may be formed an external surface of the ceramic body.

The glass is not particularly limited, and a material having the same composition as glass used for manufacturing an external electrode of a conventional multi-layered ceramic capacitor may be used.

The first electrode layers may be formed on upper and lower surfaces, and ends of the ceramic body to be electrically connected to the first and second internal electrodes, respectively.

The first electrode layers may contain 5 vol % or more of glass, compared to the conductive metal.

Next, the second electrode layers 131b and 132b may be formed by applying a conductive resin composition on the first electrode layers 131a and 132a, and then curing the conductive resin composition.

The second electrode layers 131b and 132b may include one or more conductive metals selected from the group consisting of copper (Cu), silver (Ag), nickel (Ni), and alloys thereof, and a base resin, and the base resin may be an epoxy resin.

According to an embodiment of the present disclosure, a ratio (t2/t1) of a thickness (t2) of a region in which the first electrode layers 131a and 132a are disposed on the first surface S1 and the second surface S2 in the thickness direction, the first direction of the ceramic body 110, to a thickness (t1) of a region in which the first electrode layers 131a and 132a are disposed on the third surface S3 and the fourth surface S4 in the length direction, the second direction of the ceramic body 110, may satisfy 40% to 120%.

Further, a ratio (t1/BW) of a thickness (t1) of a region in which the first electrode layers 131a and 132a are disposed on the third surface S3 and the fourth surface S4 of the ceramic body to a distance (BW) from one end of the first electrode layers 131a and 132a to the other end disposed on the first surface S1 and the second surface S2 of the ceramic body 110 may satisfy 20% or less.

Hereinafter, frequency of bending crack occurrence according to the ratio (t1/BW) of the thickness (t1) of the region in which the first electrode layers 131a and 132a are disposed on the third surface S3 and the fourth surface S4 of the ceramic body to the distance (BW) from one end of the first electrode layers 131a and 132a to the other end disposed on the first surface S1 and the second surface S2 of the ceramic body 110, may be measured, and was illustrated in the following Table 1.

In measuring the frequency of bending crack occurrence, samples of layered ceramic capacitors were mounted on a substrate, and a distance from a central portion subjected to a bending operation was set to 5 mm, and each of 60 samples was measured. It was observed whether bending strength at 5 mm was guaranteed or not.

TABLE 1

| Sample | t1/BW | Bending Strength Evaluation (Defective Number/Total Number) |
| --- | --- | --- |
| *1 | 40.0% | 6/60 |
| *2 | 33.3% | 4/60 |
| *3 | 28.6% | 5/60 |
| *4 | 25.0% | 3/60 |
| *5 | 22.2% | 3/60 |
| 6 | 20.0% | 0/60 |
| 7 | 16.6% | 0/60 |
| 8 | 14.2% | 0/60 |
| 9 | 12.5% | 0/60 |

*Comparative Example

Referring to Table 1, it can be seen that, only in the case of Samples 6 to 9 satisfying that the ratio (t1/BW) of the thickness (t1) of the region in which the first electrode layers 131a and 132a are disposed on the third surface S3 and the fourth surface S4 of the ceramic body to the distance (BW) from one end of the first electrode layers 131a and 132a to the other end disposed on the first surface S1 and the second surface S2 of the ceramic body 110, is 20% or less, according to an embodiment of the present disclosure, the bending strength characteristics at the distance of 5 mm were satisfied.

In the following Table 2, the reliability for moisture resistance was measured according to the ratio (t2/t1) of the thickness (t2) of the region in which the first electrode layers 131a and 132a are disposed on the first surface S1 and the second surface S2 in the thickness direction, the first direction of the ceramic body 110, to the thickness (t1) of the region in which the first electrode layers 131a and 132a are disposed on the third surface S3 and the fourth surface S4 in the length direction, the second direction of the ceramic body 110.

In the measurement of the reliability for moisture resistance, 400 samples of the multi-layered ceramic capacitor were prepared according to the respective ratios. Each sample was tested under conditions of a temperature of 85° C., a humidity of 85%, and 1.5 VR, to measure the defective number of the reliability for moisture resistance.

TABLE 2

| Sample | t2/t1 | Evaluation of Reliability for Moisture Resistance (Defective Number/Total Number) |
|---|---|---|
| 10 | 120.0% | 0/400 |
| 11 | 80.0% | 0/400 |
| 12 | 40.0% | 0/400 |
| *13 | 20.0% | 2/400 |
| *14 | 10.0% | 1/400 |
| *15 | 7.0% | 3/400 |
| *16 | 4.0% | 5/400 |
| *17 | 0.0% | 4/400 |

*Comparative Example

Referring to Table 2, it can be seen that, only in the case of Samples 10 to 12 satisfying that ratio (t2/t1) of the thickness (t2) of the region in which the first electrode layers 131a and 132a are disposed on the first surface S1 and the second surface S2 in the thickness direction, the first direction of the ceramic body 110, to the thickness (t1) of the region in which the first electrode layers 131a and 132a are disposed on the third surface S3 and the fourth surface S4 in the length direction, the second direction of the ceramic body 110, is 40% to 120%, according to one embodiment of the present disclosure, failure of the reliability for moisture resistance did not occur.

It can be seen that, in the case of Samples 13 to 17, which are comparative examples, not satisfying the above-mentioned numerical range of the present disclosure, failure of the reliability for moisture resistance occurred.

According to an embodiment of the present disclosure, by controlling a ratio (t2/t1) of a thickness (t2) of a region in which the first electrode layer is disposed on the first surface and the second surface of the ceramic body to a thickness (t1) of a region in which the first electrode layer is disposed on the third surface and the fourth surface of the ceramic body, and a ratio (t1/BW) of a thickness (t1) of a region in which the first electrode layer is disposed on the third surface and the fourth surface of the ceramic body to a distance (BW) from one end of the first electrode layer to the other end disposed on the first surface and the second surface of the ceramic body, in the first electrode layer of the external electrodes connected to the internal electrodes, the coverage of the corner portion of the ceramic body may increase, the reliability for moisture resistance may be enhanced, and the bending strength may be improved at the same time.

While example embodiments have been illustrated and described above, it will be apparent to those skilled in the art that modifications and variations could be made without departing from the scope of the present disclosure as defined by the appended claims.

What is claimed is:

1. A multi-layered ceramic electronic component comprising:
   a ceramic body including a dielectric layer, and first and second internal electrodes facing each other with the dielectric layer interposed therebetween, the ceramic body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and
   an external electrode disposed on an external surface of the ceramic body and electrically connected to the first internal electrodes or the second internal electrodes,
   wherein the external electrode includes a first electrode layer connected to the first internal electrodes or the second internal electrodes and a second electrode layer disposed on the first electrode layer, wherein the first electrode layer extends onto and is disposed on the first surface and the second surface of the ceramic body,
   a ratio (t2/t1) of a thickness (t2) of a region of the first electrode layer disposed on the first surface or the second surface of the ceramic body to a thickness (t1) of a region of the first electrode layer disposed on the third surface or the fourth surface of the ceramic body satisfies 40% to 120%,
   a ratio (t1/BW) of the thickness (t1) to a distance (BW), in the second direction, from one end of the first electrode layer to another end of the first electrode layer disposed on the first surface or the second surface of the ceramic body satisfies 20% or less, and
   the distance (BW) is 400 μm to 700 μm.

2. The multi-layered ceramic electronic component according to claim 1, wherein the thickness (t1) is a thickness of a region of the first electrode layer corresponding to an outermost internal electrode among the first and second internal electrodes.

3. The multi-layered ceramic electronic component according to claim 1, wherein a thickness (t3) of a region of the first electrode layer disposed at a corner portion of the ceramic body and the thickness (t2) satisfy t3<t2.

4. The multi-layered ceramic electronic component according to claim 1, wherein the ratio (t2/t1) satisfies 80% to 120%.

5. The multi-layered ceramic electronic component according to claim 1, wherein the first electrode layer comprises one or more conductive metals selected from the group consisting of copper (Cu), silver (Ag), nickel (Ni), and alloys thereof.

6. The multi-layered ceramic electronic component according to claim 1, wherein the second electrode layer comprises a base resin and one or more conductive metals selected from the group consisting of copper (Cu), silver (Ag), nickel (Ni), and alloys thereof.

7. The multi-layered ceramic electronic component according to claim 6, wherein the base resin is an epoxy resin.

8. The multi-layered ceramic electronic component according to claim 1, wherein the ceramic body includes an active portion including the first and second internal electrodes facing each other with the dielectric layer interposed therebetween, to form capacity therein, and cover portions disposed above and below the active portion.

* * * * *